US006699026B2

United States Patent
Maru et al.

(10) Patent No.: US 6,699,026 B2
(45) Date of Patent: Mar. 2, 2004

(54) INJECTION MOLDING APPARATUS

(75) Inventors: Tatsuhiko Maru, Shizuoka-ken (JP); Jun Koike, Shizuoka-ken (JP); Katsumi Watanabe, Numazu (JP); Fumiyuki Katoh, Shizuoka-ken (JP); Makoto Nishizawa, Numazu (JP); Hajime Kitamura, Fuji (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 10/417,093

(22) Filed: Apr. 17, 2003

(65) Prior Publication Data
US 2003/0198701 A1 Oct. 23, 2003

(30) Foreign Application Priority Data

| Apr. 18, 2002 | (JP) | 2002-116175 |
|---|---|---|
| Apr. 18, 2002 | (JP) | 2002-116176 |
| Apr. 18, 2002 | (JP) | 2002-116177 |
| Apr. 18, 2002 | (JP) | 2002-116178 |
| Apr. 18, 2002 | (JP) | 2002-116179 |
| Apr. 18, 2002 | (JP) | 2002-116180 |
| Mar. 19, 2003 | (JP) | 2003-075129 |
| Mar. 19, 2003 | (JP) | 2003-075130 |
| Mar. 19, 2003 | (JP) | 2003-075131 |
| Mar. 19, 2003 | (JP) | 2003-075132 |
| Mar. 19, 2003 | (JP) | 2003-075133 |
| Mar. 19, 2003 | (JP) | 2003-075134 |

(51) Int. Cl.$^7$ ............................................. B29C 45/78
(52) U.S. Cl. ........................ 425/88; 425/144; 425/572
(58) Field of Search ................................. 425/572, 143, 425/144, 88, 151

(56) References Cited

U.S. PATENT DOCUMENTS

| 4,564,348 A | * | 1/1986 | Hehl ........................ 425/151 |
| 5,183,621 A | * | 2/1993 | Yukihiro et al. ............ 425/572 |
| 6,077,064 A | * | 6/2000 | Graetz et al. ................ 425/88 |

* cited by examiner

Primary Examiner—Tim Heitbrink
(74) Attorney, Agent, or Firm—Pillsbury Winthrop LLP

(57) ABSTRACT

An injection molding apparatus comprises a cell assembly that has a tiered frame. The tiered frame is provided with lower unit storage sections and upper unit storage sections. The lower unit storage sections are provided with holders, individually, and injection molding machine units are mounted on the holders, individually. The upper unit storage sections are provided with holders, individually, and injection molding machine units are mounted on the holders, individually. Material supply pipes, temperature control piping, etc. of the injection molding machine units are arranged in a layout space on the side of a back portion of the cell assembly.

13 Claims, 7 Drawing Sheets

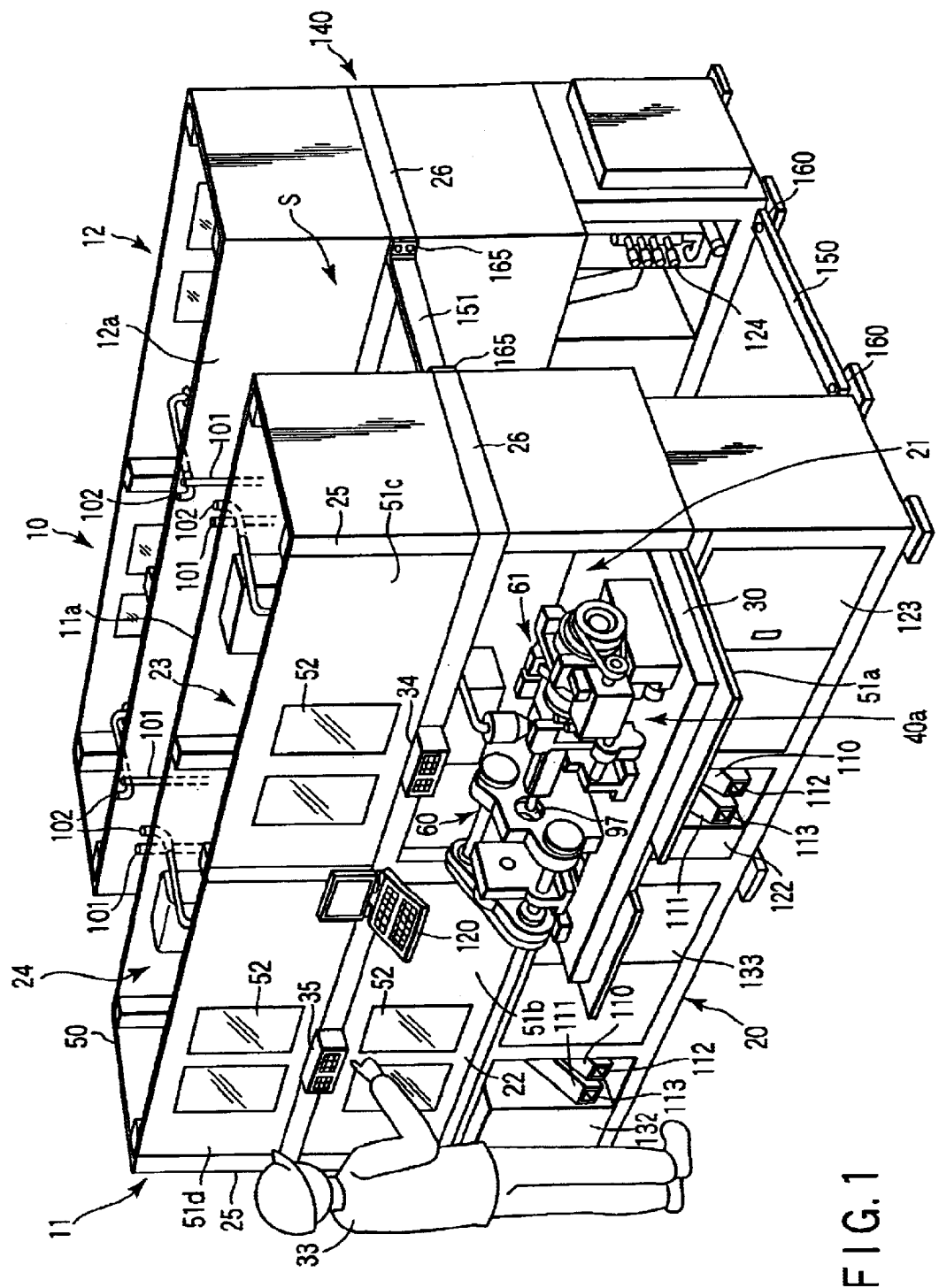
F I G. 1

INJECTION MOLDING APPARATUS

CROSS-REFERENCE TO RELATED APPLICATIONS

This application is based upon and claims the benefit of priority from the prior Japanese Patent Applications No. 2002-116175, filed Apr. 18, 2002; No. 2002-116176, filed Apr. 18, 2002; No. 2002-116177, filed Apr. 18, 2002; No. 2002-116178, filed Apr. 18, 2002; No. 2002-116179, filed Apr. 18, 2002; No. 2002-116180, filed Apr. 18, 2002; No. 2003-075129, filed Mar. 19, 2003; No. 2003-075130, filed Mar. 19, 2003; No. 2003-075131, filed Mar. 19, 2003; No. 2003-075132, filed Mar. 19, 2003; No. 2003-075133, filed Mar. 19, 2003; and No. 2003-075134, filed Mar. 19, 2003, the entire contents of all of which are incorporated herein by reference.

BACKGROUND OF THE INVENTION

1. Field of the Invention

The present invention relates to an injection molding apparatus provided with a plurality of injection molding machine units.

2. Description of the Related Art

Conventionally, in setting a plurality of injection molding machines in a plant, peripheral apparatuses, such as material supply systems and temperature control piping systems, are arranged independently for the individual machines in accordance with the respective positions of material feeders, heat medium supply piping, power sources, etc. in the plant.

If a plurality of conventional injection molding machines are set in a plant, therefore, they and their peripheral apparatuses occupy a very wide space in the plant. Since the peripheral apparatuses including the temperature control piping and material supply pipes are not arranged intensively, moreover, their maintenance operation is not easy. Further, the respective operating parts of the injection molding machines cannot be operated with ease, since they are located at distances from one another. In transporting the injection molding machines, furthermore, they must be handled separately. Therefore, the transportation entails high cost.

Conventionally, product discharge chutes of the injection molding machines are also arranged individually for the machines. If a plurality of injection molding machines are set in the plant, therefore, their respective chutes are separated from one another, so that products cannot be collected with ease. Possibly, therefore, the respective product discharge chutes of the injection molding machines may be joined together so that the products can be taken out through one outlet. If this is done, however, the products cannot be sorted for each injection molding machine. If the products require sorting, therefore, sorting operation is very troublesome.

The inventors hereof had an idea of unitizing a plurality of injection molding machines by arranging them cubically in the vertical direction. If this is done, however, the whole unit is too tall for its width, and therefore, is unstable. In order to prevent the unit from falling down during transportation, in particular, it must be bound securely. If each injection molding machine is transported independently in a truck or any other vehicle, moreover, the transportation requires a lot of vehicles and entails high cost.

BRIEF SUMMARY OF THE INVENTION

Accordingly, an object of the present invention is to provide an injection molding apparatus capable of compactly intensively incorporating a plurality of injection molding machine units. Another object of the invention is to provide an injection molding apparatus in which the respective outlets of product discharge chutes of injection molding machine units can be arranged to suit collection of products. Still another object of the invention is to provide an injection molding apparatus capable of being easily transported in a stable posture.

An injection molding apparatus according to an aspect of the invention comprises: cell assemblies comprising tiered frames having lower unit storage sections and upper unit storage sections; injection molding machine units arranged individually in the respective unit storage sections of the cell assemblies and comprising a die clamping unit and a injection unit each; temperature controllers which control the respective die temperatures of the injection molding machine units; material supply means which supply a material to the injection molding machine units; and operating parts for operating the injection molding machine units. Peripheral apparatuses, such as piping of the temperature controllers and the material supply means, are arranged in a layout space on the side opposite from the operating side of the cell assemblies.

According to this configuration, peripheral apparatuses, such as the temperature control piping and the material supply means of the injection molding machine units, are arranged on the back portion of the common tiered frame. Thus, the respective peripheral apparatuses of the injection molding machine units can be located intensively in the layout space on the side opposite from the operating side. According to the injection molding apparatus of the invention, therefore, the apparatus layout can be made compact and simple.

In an injection molding apparatus according to another aspect of the invention, first and second cell assemblies, which are constructed in the same manner as the aforesaid cell assembly, are arranged side by side so that a space accessible to a maintenance man or woman is secured between the respective back portions of the first and second cell assemblies. This space may be also used as a layout space in which the peripheral apparatuses of the injection molding machine units can be located.

According to this configuration, peripheral apparatuses, such as temperature control piping and material supply means of the injection molding machine units, can be arranged intensively in the layout space behind the common tiered frame. Thus, the apparatus layout can be made compact and simple, and a working space can be secured between the respective back portions of the first and second cell assemblies, so that maintenance operation or the like can be carried out more easily.

An injection molding apparatus according to the invention comprises: cell assemblies comprising tiered frames having lower unit storage sections and upper unit storage sections; and injection molding machine units arranged individually in the respective unit storage sections of the cell assemblies and comprising a die clamping unit and a injection unit each.

According to this configuration, the injection molding machine units can be arranged cubically in the lower and upper unit storage sections, so that a limited space in a plant can be utilized effectively, and the floor area for installation can be reduced. Further, temperature control piping and peripheral apparatuses of the injection molding machine units can be arranged intensively in the common tiered frame, and the operating efficiency and maintainability of the injection molding machine units can be improved.

Preferably, according to the invention, the cell assemblies are provided with operating parts capable of independently starting and stopping the operation of the injection molding machine units.

According to this configuration, the operating parts of the cell assemblies can independently control the start and stop of the operation of the injection molding machine units. Thus, a desired one of the injection molding machine units of one injection molding apparatus can be efficiently operated as required.

Preferably, according to the invention, the cell assemblies are provided with operating parts for operating the injection molding machine units, temperature controllers which control the respective die temperatures of the injection molding machine units, material supply means which supply a material to the injection molding machine units, and a cover member which covers the injection molding machine units.

According to this configuration, the common tiered frame may be provided with the temperature controllers, material supply means, cover member, etc. Thus, the use of the common tiered frame is conducive to the compactness, simple construction, and low-cost manufacture of the apparatus.

An injection molding apparatus according to the invention comprises: cell assemblies comprising tiered frames having lower unit storage sections and upper unit storage sections; lower injection molding machine units arranged individually in the lower unit storage sections and comprising a die clamping unit and a injection unit each; upper injection molding machine units arranged individually in the upper unit storage sections and comprising a die clamping unit and a injection unit each; lower-stage product discharge chutes attached individually to the cell assemblies and extending under dies of the lower injection molding machine units; upper-stage product discharge chutes attached individually to the cell assemblies and extending under dies of the upper injection molding machine units, the lower-stage product discharge chutes and the upper-stage product discharge chutes being staggered in the longitudinal or transverse direction of the cell assemblies.

According to this invention, the injection molding machine units can be located intensively and compactly by being arranged cubically in the lower and upper unit storage sections. Further, the lower- and upper-stage product discharge chutes can be arranged intensively in the common tiered frame, and the respective outlets of the product discharge chutes for the individual units can be arranged on the operating side of the cell assemblies so that products can be easily collected or sorted.

In the present invention, the lower injection molding machine units and the upper injection molding machine units may be staggered in the longitudinal or transverse direction of the cell assemblies so that the lower-stage product discharge chutes and the upper-stage product discharge chutes are staggered in the longitudinal or transverse direction of the cell assemblies.

According to this invention, the product discharge chutes are staggered by shifting the positions of the whole upper units with respect to the lower units, so that the lower and upper units can enjoy a common configuration with respect to the product discharge chutes.

An injection molding apparatus according to still another aspect of the invention comprises: cell assemblies comprising tiered frames having lower unit storage sections and upper unit storage sections; lower injection molding machine units arranged individually in the lower unit storage sections and comprising a die clamping unit and a injection unit each; and upper injection molding machine units arranged individually in the upper unit storage sections and comprising a die clamping unit and a injection unit each. At least the lower unit storage sections, out of the lower and upper unit storage sections, are provided with moving holders capable of being drawn out from the tiered frames, and the injection molding machine units are mounted on the moving holders.

Although the moving holders are moved substantially in the horizontal direction, they may be inclined at some angle to a horizontal plane, depending on the weight of the injection molding machine units.

According to this configuration, the injection molding machine units can be located intensively and compactly by being arranged cubically in the lower and upper unit storage sections. According to this invention, moreover, at least the lower injection molding machine units are mounted on the moving holders so that they can be drawn out for maintenance or the like. Thus, the operation can be carried out easily and safely.

An injection molding apparatus according to a further aspect of the invention comprises: a first cell assembly comprising a tiered frame having lower unit storage sections and upper unit storage sections; a second cell assembly comprising a tiered frame having lower unit storage sections and upper unit storage sections; injection molding machine units arranged individually in the respective unit storage sections of the first and second cell assemblies and comprising a die clamping unit and a injection unit each; and coupling means which couple the first and second cell assemblies to each other. At least the lower unit storage sections of the first and second cell assemblies are provided with moving holders capable of being drawn out from the tiered frames, and the injection molding machine units are mounted on the moving holders.

According to this configuration, the first and second cell assemblies are coupled to each other, so that the apparatus can enjoy a substantial overall width. If the center of gravity shifts its position to the operating side as the injection molding machine units are drawn out to the operating side, therefore, satisfactory stability can be obtained.

An injection molding apparatus of the invention comprises: a first cell assembly comprising a tiered frame having lower unit storage sections and upper unit storage sections; a second cell assembly comprising a tiered frame having lower unit storage sections and upper unit storage sections; injection molding machine units arranged individually in the respective unit storage sections of the first and second cell assemblies and comprising a die clamping unit and a injection unit each; and coupling means which couple the first and second cell assemblies to each other with the respective back portions thereof kept apart.

According to this configuration, the injection molding machine units can be located intensively and compactly by being arranged cubically in the lower and upper unit storage sections. According to the invention, the first and second cell assemblies are coupled to each other, so that the apparatus can enjoy a substantial overall width. Thus, the posture is stabilized and the stiffness is enhanced, so that vibration can be restrained.

Preferably, the first and second cell assemblies are coupled to each other by means of the coupling means with a space accessible to an operator secured between the respective back portions of the cell assemblies, and temperature control piping and material supply means are arranged in the space.

According to this configuration, the space between the respective back portions of the first and second cell assemblies can be utilized for maintenance, so that the operation is easy. This space can be also used as a layout space in which some of peripheral apparatuses, such as the temperature control piping and the material supply pipes, are arranged. Thus, the peripheral apparatuses can be restrained from being exposed to the outside of the cell assemblies, so that the external appearance is improved.

An injection molding apparatus according to the invention comprises: a first cell assembly comprising a tiered frame having lower unit storage sections and upper unit storage sections; a second cell assembly comprising a tiered frame having lower unit storage sections and upper unit storage sections; and injection molding machine units arranged individually in the respective unit storage sections of the first and second cell assemblies and comprising a die clamping unit and a injection unit each. The respective tiered frames of the first and second cell assemblies are provided with junctions which butt the cell assemblies during transportation of the cell assemblies.

According to this configuration, the injection molding machine units can be located intensively and compactly by being arranged cubically in the lower and upper unit storage sections. According to the invention, moreover, the first and second cell assemblies are butted against each other as they are coupled for transportation, so that the floor area for transportation can be reduced, and the stability can be improved. Furthermore, the trouble of binding can be made less than in the case the first and second cell assemblies are bound separately by means of a wire rope or the like during transportation.

Preferably, according to the invention, the respective tiered frames of the first and second cell assemblies are provided with the junctions on the back portions thereof, and the junctions are coupled to each other by means of bolts with the cell assemblies back to back during transportation.

According to this configuration, the junctions on the respective back portions of the first and second cell assemblies are coupled by means of the bolts, so that the cell assemblies can be directly coupled back to back.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view of an injection molding apparatus according to a first embodiment of the invention;

DETAILED DESCRIPTION OF THE INVENTION

Figure 2:
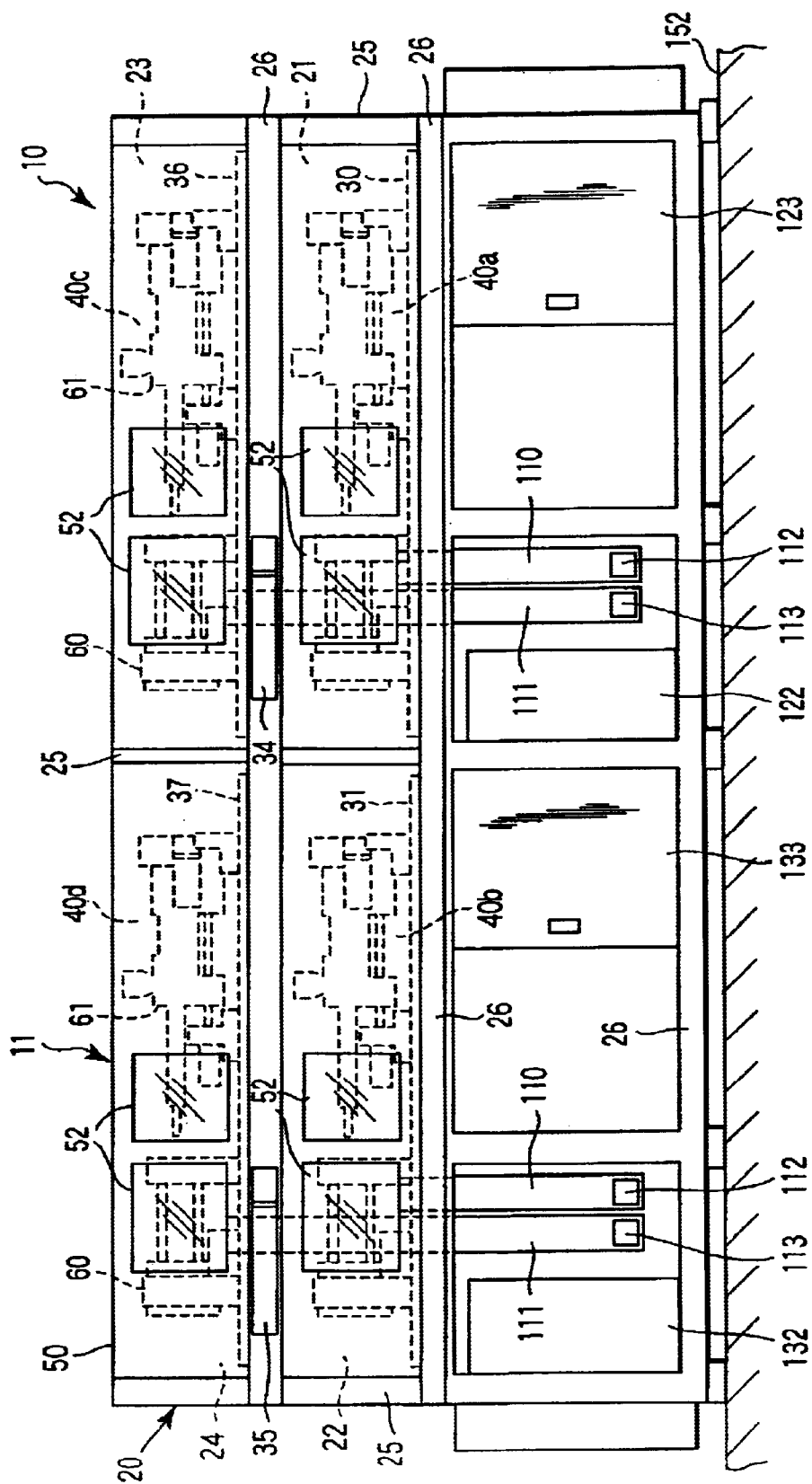
FIG. 2 is a front view of the injection molding apparatus shown in FIG. 1.

An injection molding apparatus 10 according to a first embodiment of the present invention will now be described with reference to FIGS. 1 to 5.

The injection molding apparatus 10 comprises a first cell assembly 11 situated on the foreground side of FIG. 1 and a second cell assembly 12 on the background side. Since the first and second cell assemblies 11 and 12 have the same construction, the first cell assembly 11 will be representatively described below.

The first cell assembly 11 is provided with a tiered frame 20 that includes lower unit storage sections 21 and 22 and upper unit storage sections 23 and 24. The tiered frame 20 is a highly stiff box-shaped frame, which is formed by combining a plurality of post members 25 that extend vertically and a plurality of beam members 26 that extend horizontally.

Figure 4:
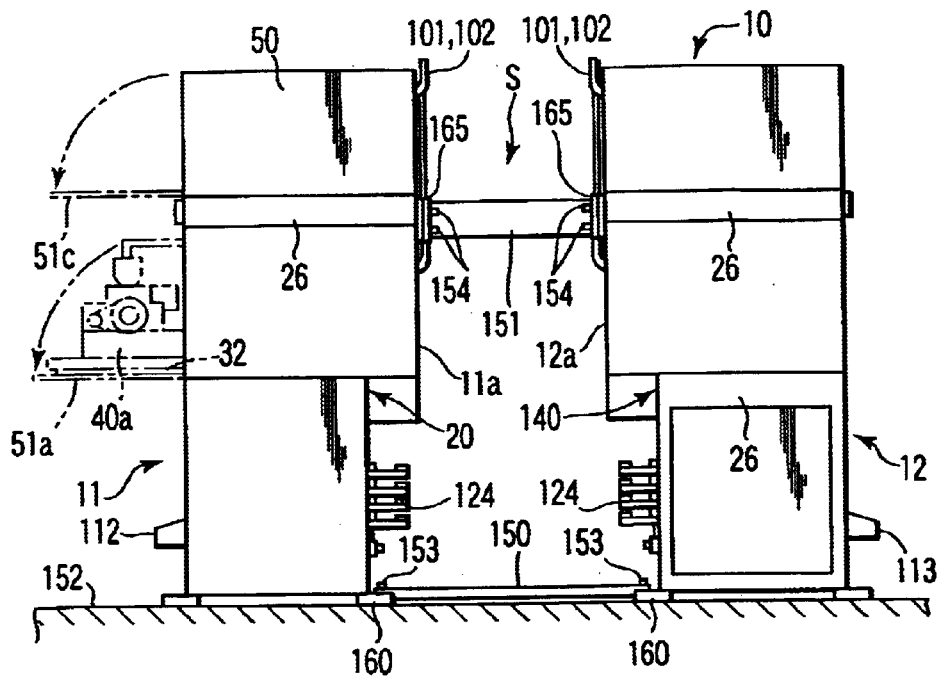
FIG. 4 is a side view of the injection molding apparatus shown in FIG. 1.

As shown in FIG. 2, the lower unit storage sections 21 and 22 are provided with moving holders 30 and 31, respectively. Injection molding machine units 40a and 40b are mounted on the moving holders 30 and 31, respectively. The moving holders 30 and 31 can be drawn out along a horizontally extending guide member 32 (part of which is shown in FIG. 4) to the operating side. The operating side stated herein is the side on which operating parts 34 and 35 to be manipulated by an operator 33 are located.

The upper unit storage sections 23 and 24 are also provided with holders 36 and 37, respectively. Injection molding machine units 40c and 40d are mounted on the holders 36 and 37, respectively. In this embodiment, the injection molding machine units 40a to 40d have a common configuration. In some cases, injection molding machine units of a plurality of types having different configurations may be stored in the unit storage sections 21 to 24, individually.

The injection molding machine units 40a to 40d are covered by a cover member 50 that is attached to the tiered frame 20. The cover member 50 is provided with front covers 51a, 51b, 51c and 51d that can be swung open to the operating side. Windows 52 of an optical transparent material or the like are formed in each of the front covers 51a to 51d so that the machine units 40a to 40d can be seen through the windows.

Figure 3:
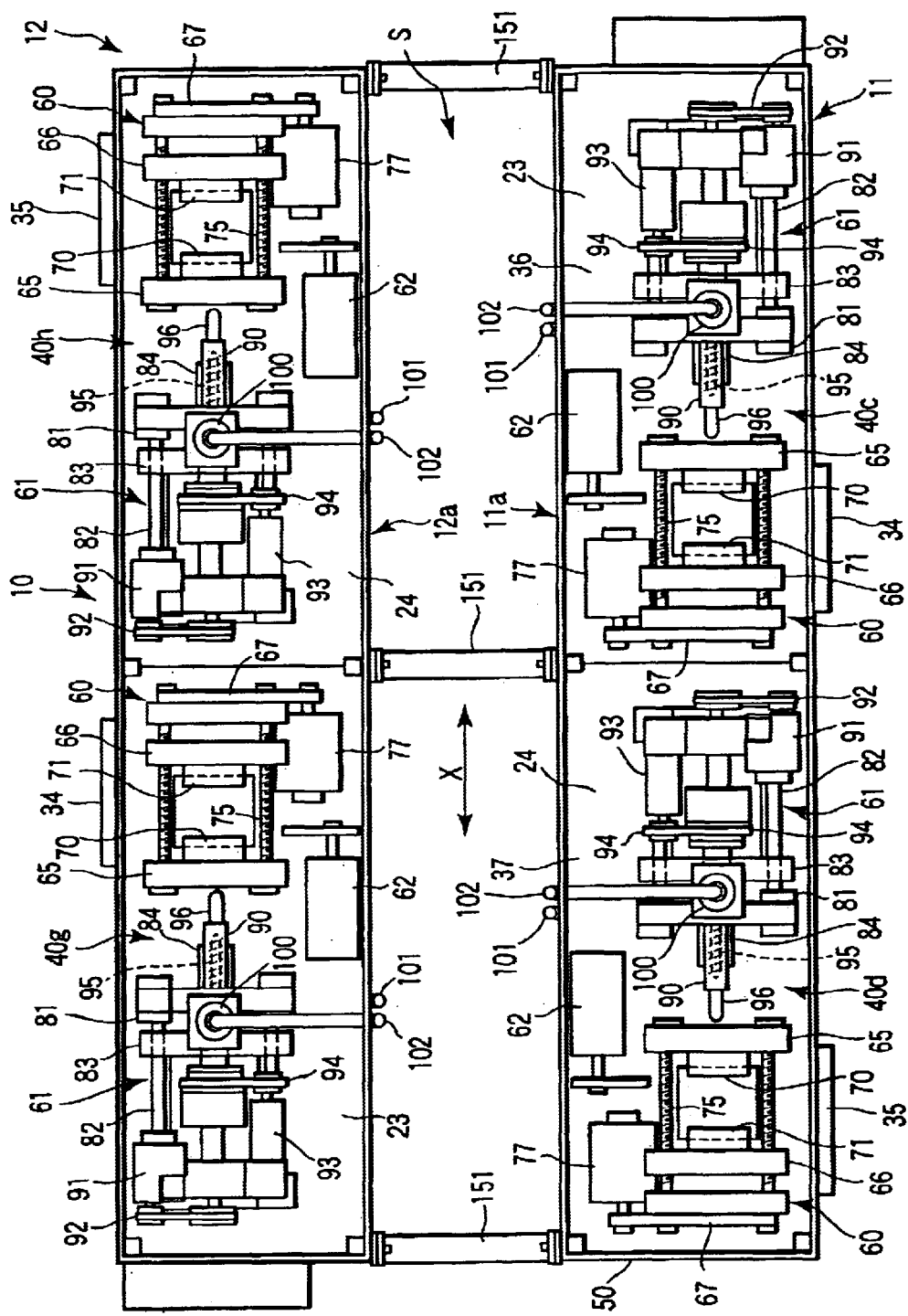
FIG. 3 is a plan view of the injection molding apparatus shown in FIG. 1.

As shown in FIG. 3, each of the injection molding machine units 40a to 40d comprises a die clamping unit 60, an injection unit 61, a sprue ejector 62, etc. An example of the die clamping unit 60 comprises a stationary platen 65, a movable platen 66, a platen drive mechanism 67, etc.

A stationary die 70 is mounted on the stationary platen 65. A movable die 71 is mounted on the movable platen 66. An example of the platen drive mechanism 67 is composed of a ball screw 75, a servomotor 77 for rotating the screw 75, etc.

The injection unit 61 comprises a base member 81, a guide member 82, a movable frame 83, etc. The movable frame 83 can reciprocate from side to side (or in the direction of an axis X shown in FIG. 3) along the guide member 82. The movable frame 83 can be moved in the direction of the axis X by means of a geared motor 84 for nozzle touch.

The movable frame 83 is provided with a heating barrel 90, servomotor 91 for injection, power transmission mechanism 92 for injection, servomotor 93 for screw rotation, power transmission mechanism 94 for screw rotation, etc. A screw 95 is held in the barrel 90. A nozzle 96 that is attached to the distal end portion of the barrel 90 is situated on the center line of a hole 97 (shown in FIG. 1) in the stationary platen 65.

When the movable frame 83 is advanced by means of the geared motor 84 for nozzle touch so that the barrel 90 is advanced to a given position, the distal end of the nozzle 96 engages an injection port of the stationary die 70.

The screw 95 can be axially moved relatively to the barrel 90 by means of the servomotor 91 and the power transmission mechanism 92 for injection. The screw 95 can be rotated by means of the servomotor 93 and the power transmission mechanism 94 for screw rotation when a resin as the material of injection-molded products is kneaded or metered.

A heater (not shown) for heating and melting the resin is attached to the barrel 90. A hopper 100 for resin supply is disposed near the basal part of the barrel 90. A material supply pipe 101 that serves as material supply means is connected to the hopper 100 of each of the lower injection molding machine units 40*a* and 40*b*. A material supply pipe 102 is also connected to the hopper 100 of each of the upper injection molding machine units 40*c* and 40*d*.

A product discharge chute 110 for taking out molded products is located under each of the respective dies 70 and 71 of the lower injection molding machine units 40*a* and 40*b*. A product discharge chute 111 is also located under each of the respective dies 70 and 71 of the upper injection molding machine units 40*c* and 40*d*. These chutes 110 and 111 extend under the dies 70 and 71.

As shown in FIG. 2, the respective product discharge chutes 110 of the lower injection molding machine units 40*a* and 40*b* and the respective product discharge chutes 111 of the upper injection molding machine units 40*c* and 40*d* are staggered in the longitudinal direction of the injection molding apparatus 10 (or in the direction of the axis X shown in FIG. 3). Product outlets 112 and 113 at the lower ends of the product discharge chutes 110 and 111, respectively, open on the operating side of the cell assembly 11. Thus, products that are molded by means of the injection molding machine units 40*a* to 40*d* can be sorted with ease.

A controller 120 (shown in FIG. 1) that is formed of an information processor such as a personal computer is provided on the operating side of the cell assembly 11. One controller 120 that serves as a setter can control the operation of each of the four injection molding machine units 40*a* to 40*d*.

As shown in FIG. 2, the operating part 34, a temperature controller 122, a console 123, etc. are incorporated in the right-hand half of the cell assembly 11. The operating part 34 is provided with switches for operating the right-hand injection molding machine units 40*a* and 40*c*. The temperature controller 122 is used to control the respective temperatures of the dies 70 and 71 of the machine units 40*a* and 40*c*. The operating part 34 is provided with switches that can independently start and stop the operation of the injection molding machine units 40*a* and 40*c*.

As shown in FIG. 4, some of temperature control piping 124 and peripheral apparatuses such as the material supply pipes 101 and 102 are arranged on a back portion 11*a* of the cell assembly 11, that is, on the side opposite from the operating side. The piping 124 is represented by temperature control pipes, joints, valves, etc. for the injection molding machine units 40*a* and 40*c*. The temperature controller 122 supplies various parts of the injection molding machine units 40*a* and 40*c* with a heat medium, such as a fluid for heating the dies 70 and 71 or a fluid for cooling the lower part of the hopper 100, through the temperature control piping 124.

As shown in FIG. 2, the operating part 35, a temperature controller 132, a console 133, etc. are incorporated in the left-hand half of the cell assembly 11. The operating part 35 is used to operate the left-hand injection molding machine units 40*b* and 40*d*. The temperature controller 132 is used to control the respective temperatures of the dies 70 and 71 of the machine units 40*b* and 40*d*. The operating part 35 is provided with switches that can independently start and stop the operation of the injection molding machine units 40*b* and 40*d*.

Some peripheral apparatuses, such as the temperature control piping 124 and the material supply pipes 101 and 102 of the injection molding machine units 40*b* and 40*d*, are arranged on the back portion 11*a* of the cell assembly 11.

The second cell assembly 12 on the background side of FIG. 1, like the first cell assembly 11, is provided with a tiered frame 140. The tiered frame 140 is provided with lower unit storage sections 21 and 22 and upper unit storage sections 23 and 24, which resemble those of the first cell assembly 11. Injection molding machine units 40*e* to 40*h* are stored in the unit storage sections 21 to 24, respectively. FIG. 3 shows only the upper units 40*g* and 40*h* out of the injection molding machine units 40*e* to 40*h*.

The second cell assembly 12 is provided with operating parts 34 and 35, controller 120, temperature controllers 122 and 132, and consoles 123 and 133, which resemble those of the first cell assembly 11. Some peripheral apparatuses, such as the temperature control piping 124 and the material supply pipes 101 and 102, are arranged on a back portion 12*a* of the cell assembly 12.

As shown in FIG. 4, first and second cell assemblies 11 and 12 on a plant floor 152 are coupled to each other by means of lower and upper coupling members 150 and 151 that serve as coupling means, with their respective back portions 11*a* and 12*a* opposed to each other. Formed between the first and second cell assemblies 11 and 12 is a space S that is accessible to a maintenance man or woman.

The lower coupling member 150 is fixed to junctions 160 under the frames 20 and 140 by means of fastening members 153 such as bolts. The upper coupling member 151 is fixed to junctions 165 over the frames 20 and 140 by means of fastening members 154 such as bolts.

The operation of the injection molding apparatus 10 will now be described in connection with the injection molding machine units 40*a* to 40*d* of the first cell assembly 11.

The dies 70 and 71 are closed by means of the die clamping unit 60, and the barrel 90 is advanced toward the stationary platen 65 by means of the geared motor 84 for nozzle touch. By doing this, the distal end of the nozzle 96 is caused to engage the injection port of the stationary die 70.

Then, the servomotor 91 for injection is rotated to advance the screw 95. Thereupon, a previously metered molten resin in the barrel 90 is pushed out from the distal end of the nozzle 96 by means of the screw 95 and loaded into the dies 70 and 71.

After the resin in the dies 70 and 71 is cooled, the servomotor 91 for injection is rotated reversely, whereupon the screw 95 is retreated for a given distance. Further, the screw 95 is rotated by means of the servomotor 93 for screw rotation. Thereupon, the molten resin is kneaded and metered as it is fed toward the distal end of the barrel 90.

The movable platen 66 is retreated by means of the drive mechanism 67 of the die clamping unit 60, whereupon the dies 70 and 71 are opened. Further, the sprue ejector 62 is actuated, and each product in the die 71 is pushed out and dropped into the product discharge chute 110 (or 111) by means of an ejector mechanism. Thereupon, injection molding processes for one cycle terminate.

In this injection molding apparatus 10, the first cell assembly 11 is provided with the four injection molding machine units 40*a* to 40*d*, and the second cell assembly 12 is also provided with the four injection molding machine units 40*e* to 40*h*. Therefore, injection-molded products of the same kind can be produced efficiently. Further, injection-molded products of different kinds can be simultaneously produced depending on the types of the injection molding machine units 40*a* to 40*h*.

In the injection molding apparatus 10, the paired injection molding machine units 40*c* and 40*d* are arranged cubically on the paired injection molding machine units 40*a* and 40*b*. Accordingly, the space over the floor 152 can be utilized effectively. Thus, the floor area in a plant can be substantially halved, when compared with the case of conventional injection molding machines that are arranged only side by side.

In the injection molding apparatus 10, the outlets 112 and 113 of the respective chutes 110 and 111 of the individual units 40a to 40h are located intensively on the operating side, so that the products can be collected with ease.

Since the outlets 112 and 113 of the respective chutes 110 and 111 of the individual units 40a to 40h are independent of one another, the products can be separately collected for the individual units 40a to 40h. For the same reason, any of the units 40a to 40h in which defective products, if any, are formed can be discriminated with ease.

Figure 5:
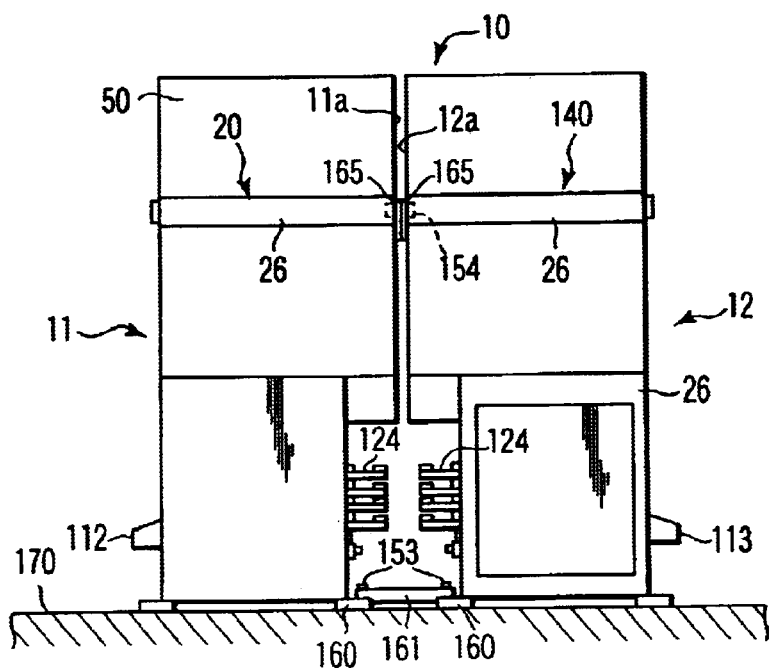
FIG. 5 is a side view showing the way first and second cell assemblies of the injection molding apparatus shown in FIG. 1 are brought close to each other and coupled back to back.

In transporting the injection molding apparatus 10, the first and second cell assemblies 11 and 12 are brought close to each other and coupled back to back, as shown in FIG. 5. For example, the junctions 160 that are located under the frames 20 and 140 of the cell assemblies 11 and 12 are coupled to each other by means of a tacking member 161 and the fastening members 153, e.g., bolts. Further, the junctions 165 that are located over the frames 20 and 140 are coupled to each other by means of the fastening members 154, e.g., bolts.

By bringing the cell assemblies 11 and 12 close to each other and directly coupling them back to back in this manner, the injection molding apparatus 10 (FIG. 5) can be made thinner when it is transported than when it is installed in the manner shown in FIG. 4. Thus, the apparatus 10 can be easily loaded onto a bed 170, such as the bed of a truck for transportation or a pallet.

By thus coupling the first and second cell assemblies 11 and 12 back to back to each other, the floor area for transportation can be reduced, and the safety of transportation can be improved. Since the cell assemblies 11 and 12 can be bound together by means of a wire rope or the like during transportation, moreover, the trouble of binding and the necessary quantity of crating material can be made less than in the case the cell assemblies 11 and 12 are bound separately.

After the injection molding apparatus 10 is carried into the plant, the respective back portions 11a and 12a of the cell assemblies 11 and 12 are separated for a given distance as in the shown in FIG. 4. Further, the respective frames 20 and 140 of the cell assemblies 11 and 12 are coupled to each other by means of the coupling members 150 and 151 and the fastening members 153 and 154.

The width of the injection molding apparatus 10 can be increased in this manner. Even if the individual cell assemblies 11 and 12 are unstable because they are too tall for their width, therefore, their stability on the plant floor 152 can be enhanced by connecting them by means of the coupling members 150 and 151. Further, a working space S that serves also as a layout space for the peripheral apparatuses can be secured between the respective back portions 11a and 12a of the first and second cell assemblies 11 and 12.

If the cell assemblies 11 and 12 are thus coupled by means of the coupling members 150 and 151, the injection molding machine units 40a to 40d of the first cell assembly 11 and the injection molding machine units 40e to 40h of the second cell assembly 12 are directed in opposite directions, as shown in FIG. 3.

Accordingly, vibration that is produced when the injection molding machine units 40a to 40d of the first cell assembly 11 are operated and vibration that is produced when the injection molding machine units 40e to 40h of the second cell assembly 12 are operated act in directions such that they cancel each other. Thus, the force of vibration that urges the injection molding apparatus 10 to move in a specific direction during injection molding operation can be canceled.

The injection molding apparatus 10 can easily carry out operation for the maintenance or trouble-shooting of the injection molding machine units 40a to 40h. In carrying out the maintenance or the like of the lower injection molding machine units 40a and 40b, for example, the operation can be facilitated by drawing out the moving holder 30 to the operating side, as shown in FIG. 1. Even when the injection molding machine units 40b to 40d are operating, therefore, the maintenance operation for the injection molding machine unit 40a can be carried out safely by stopping the unit 40a and drawing it out to the operating side.

According to this embodiment, the first and second cell assemblies 11 and 12 are coupled to each other by means of the coupling members 150 and 151, so that the injection molding apparatus 10 can enjoy a substantial overall width. If the center of gravity shifts its position to the operating side as the injection molding machine units 40a and 40b are drawn out to the operating side, therefore, satisfactory stability can be obtained. Besides the lower ones, the upper holders 36 and 37 may be designed to be movable so that the upper injection molding machine units 40c to 40d can be drawn out of the tiered frame 20.

In carrying out the maintenance or the like of the upper injection molding machine units 40c and 40d, the upper front covers 51c and 51d are opened, as shown in FIG. 4. Also since the top of the cover member 50 is open, according to this embodiment, the operation can be carried out more easily. Since an operator can enter the space S between the cell assemblies 11 and 12, moreover, various peripheral apparatuses, such as the temperature control piping 124, the material supply pipes 101 and 102, and power cables of the motors 77, 84, 91 and 93, can be operated with higher efficiency.

Figure 6:
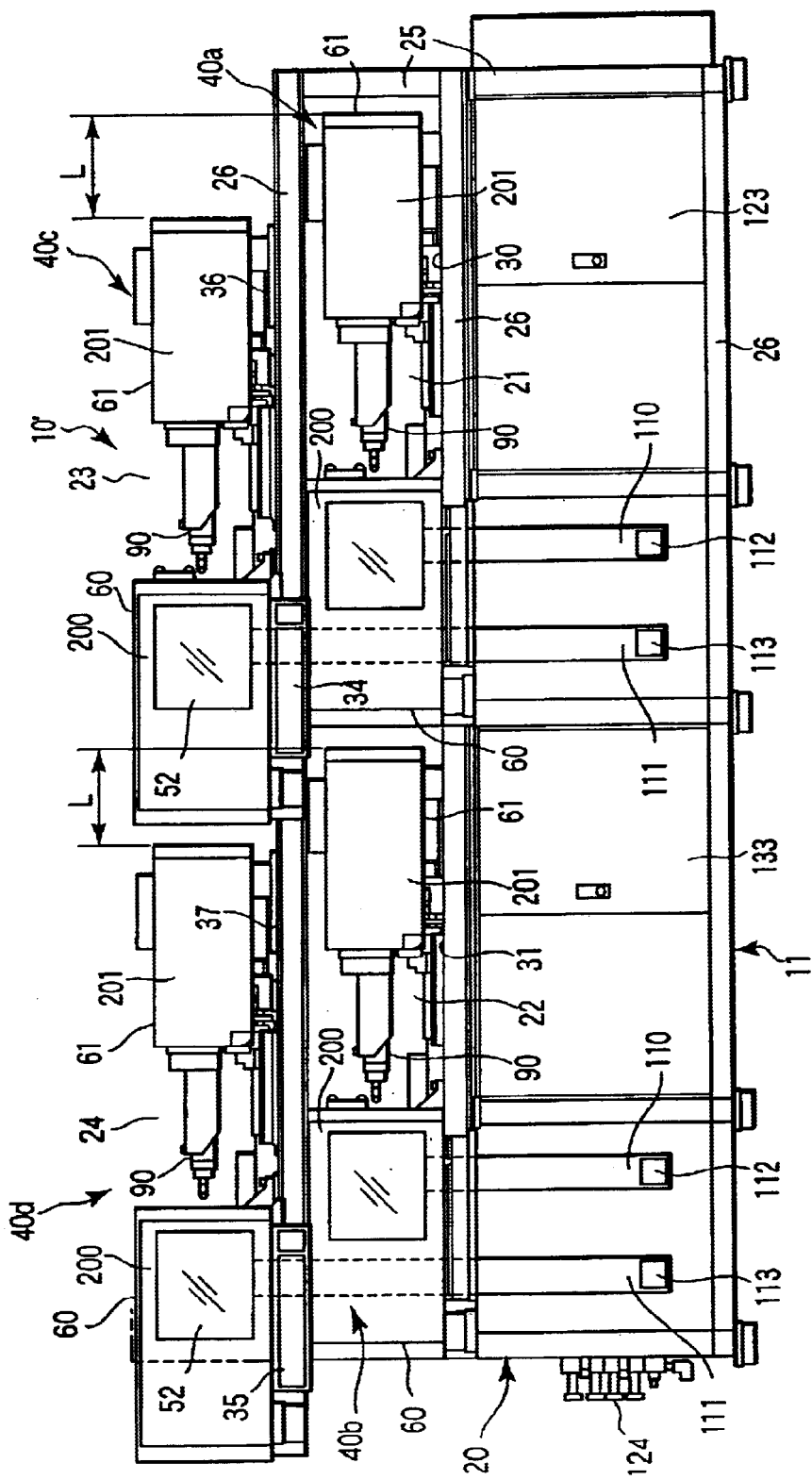
FIG. 6 is a front view of an injection molding apparatus according to a second embodiment of the invention.

FIG. 6 shows an injection molding apparatus 10' according to a second embodiment of the invention. The injection molding apparatus 10', like the injection molding apparatus 10 of the first embodiment, comprises lower unit storage sections 21 and 22 and upper unit storage sections 23 and 24. Injection molding machine units 40a and 40b are mounted on moving holders 30 and 31 of the lower unit storage sections 21 and 22, respectively. Common numerals are used to designate common portions of this injection molding apparatus 10' and the injection molding apparatus 10 of the first embodiment, and a description of those portions is omitted.

Injection molding machine units 40c and 40d are mounted on holders 36 and 37 of the upper unit storage sections 23 and 24, respectively. A die clamping unit 60 and an injection unit 61 of each of the injection molding machine units 40a to 40d are covered by independent cover members 200 and 201, respectively.

The upper injection molding machine units 40c and 40d and the lower injection molding machine units 40a and 40b are staggered for a dimension L in the longitudinal direction of the apparatus. By doing this, the respective product discharge chutes 110 of the lower units 40a and 40b and the respective product discharge chutes 111 of the upper units 40c and 40d can be staggered in the longitudinal direction, so that the layout of the chutes 110 and 111 and the outlets 112 and 113 can be facilitated.

In the injection molding apparatus 10' of the second embodiment described above, the chutes 110 and 111 are staggered by staggering the lower units 40a and 40b and the upper units 40c and 40d in the longitudinal direction. Thus, the lower units 40a and 40b and the upper units 40c and 40d can enjoy a common configuration with respect to the chutes 110 and 111.

In either of the embodiments described above, one of the lower- and upper-stage product discharge chutes 110 and 111 may be located on the operating side of each of the cell assemblies 11 and 12. In this case, the other chute is located on the side of each of the back portions 11a and 12a, that is, on the side opposite from the operating side. Alternatively, the lower- and upper-stage chutes 110 and 111 may be located in the lower and upper parts, respectively, of each cell assembly 11 or 12.

Figure 7:
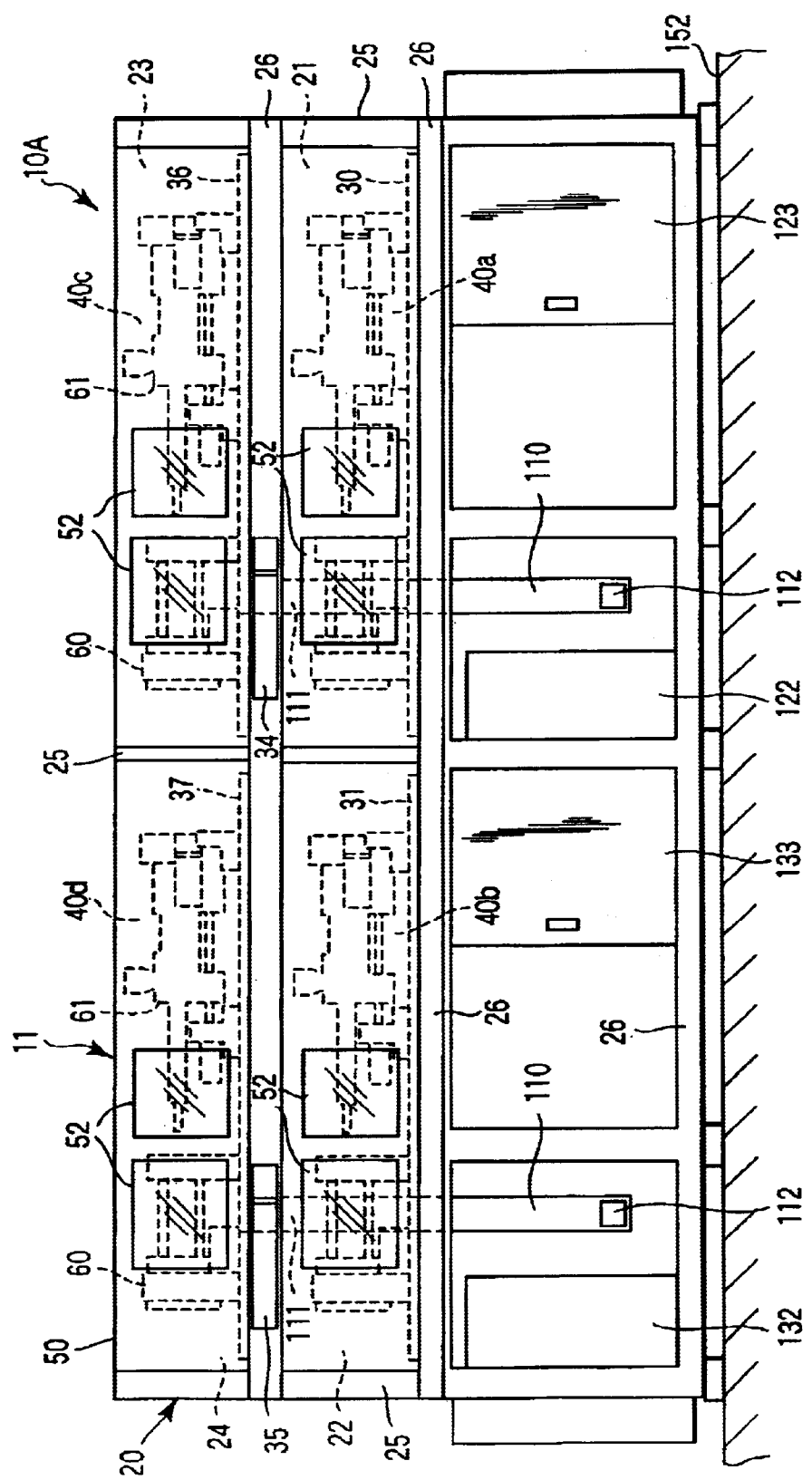
FIG. 7 is a front view of an injection molding apparatus according to a third embodiment of the invention.
Figure 8:
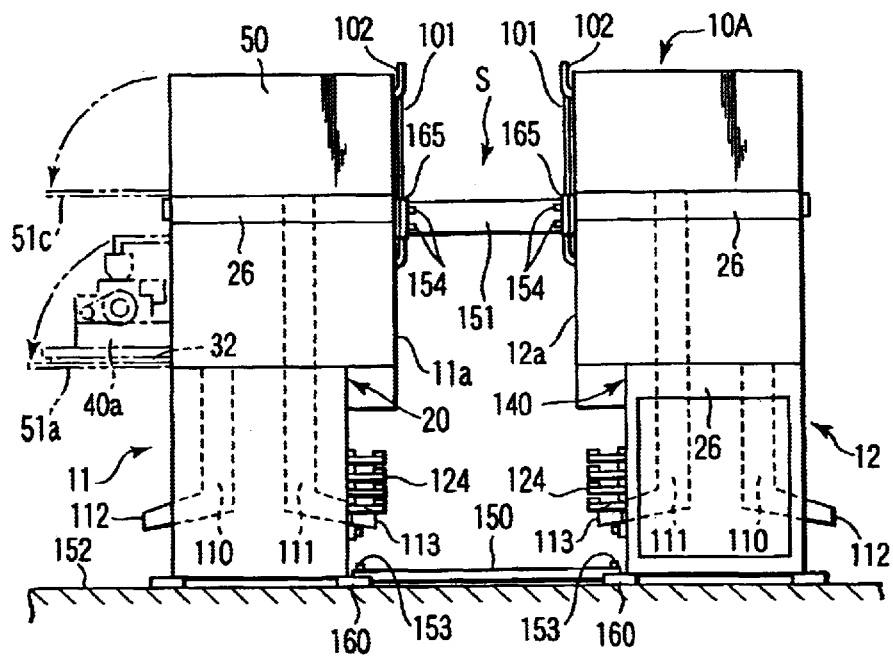
FIG. 8 is a side view of the injection molding apparatus shown in FIG. 7.

FIGS. 7 and 8 show an injection molding apparatus 10A according to a third embodiment of the invention. In this embodiment, the respective chutes 110 of the lower units 40a and 40b are situated on the foreground side nearer to the operator. The respective chutes 111 of the upper units 40c and 40d are situated on the background side remoter from the operator. Thus, the respective chutes 110 of the lower units 40a and 40b and the respective chutes 111 of the upper 40c and 40d are staggered in the transverse direction. The respective positions of the lower- and upper-stage chutes 110 and 111 in the longitudinal direction of the apparatus are in line with each other, as shown in FIG. 7.

As shown in FIG. 8, the outlet 112 of each lower-stage chute 110 is directed to the operator side. The outlet 113 of each upper-stage chute 111 faces backward. The injection molding apparatus 10A of the third embodiment shares other configurations with the injection molding apparatus 10 of the first embodiment.

Figure 9:
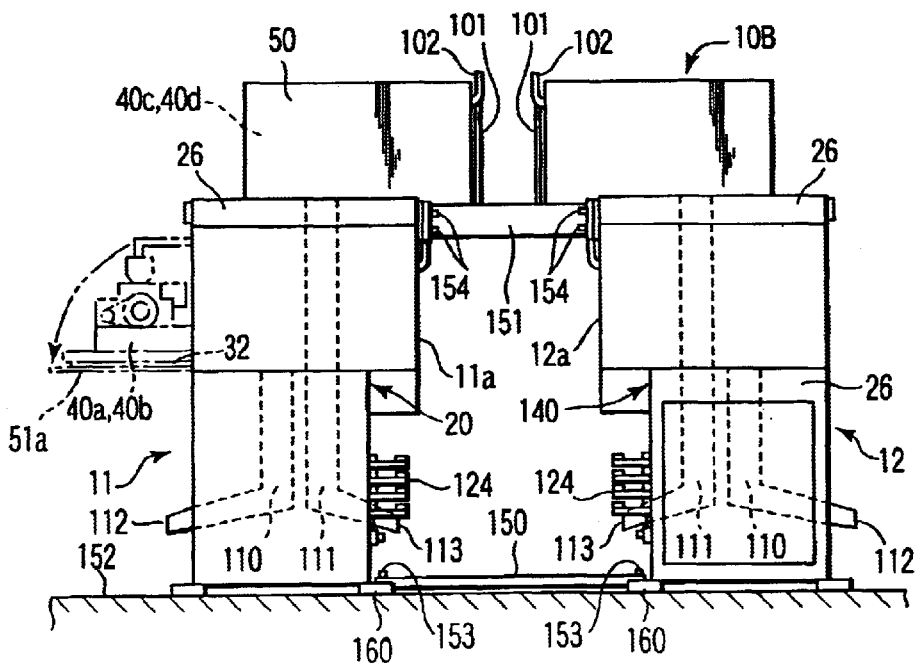
FIG. 9 is a side view of an injection molding apparatus according to a fourth embodiment of the invention.

FIG. 9 shows an injection molding apparatus 10B according to a fourth embodiment of the invention. In this embodiment, chutes 110 and 111 are staggered in the transverse direction of the apparatus by staggering lower units 40a and 40b and upper units 40c and 40d of a first cell assembly 11 in the transverse direction. If the chutes 110 and 111 are staggered, therefore, the lower units 40a and 40b and the upper units 40c and 40d can enjoy a common configuration. A second cell assembly 12 is constructed in the same manner. The injection molding apparatus 11B of the fourth embodiment shares other configurations with the injection molding apparatus 10A of the third embodiment.

According to the present invention, the moving holders need not always be drawn out to the operating side, and may alternatively be drawn out sideways or on the backside of the cell assembly. In short, the moving holders must only be designed so that the injection molding machine units can be drawn out of the tiered frame. Besides the lower ones, moreover, the upper holders may be designed to be movable so that the upper injection molding machine units can be drawn out of the tiered frame.

The injection molding machine units according to the invention are not limited to the embodiments described above, and may be units of any other configurations. Further, each cell assembly may be configured to have one injection molding machine unit in each of its upper and lower stages.

The injection molding apparatus of the present invention may be provided with only one cell assembly, and the tiered frame may be provided with storage sections in three or more stages. The present invention is also applicable to injection molding apparatuses for metallic or rubber products as well as to injection molding apparatuses for plastic products.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An injection molding apparatus comprising:
   cell assemblies comprising tiered frames having lower unit storage sections and upper unit storage sections;
   injection molding machine units arranged individually in the respective unit storage sections of the cell assemblies and comprising an die clamping unit and a injection unit each;
   temperature controllers which control the respective temperatures of the injection molding machine units; and
   material supply means which supply a material to the injection molding machine units,
   piping of the temperature controllers and the material supply means being arranged in a layout space on the backside of the cell assemblies.

2. An injection molding apparatus comprising:
   a first cell assembly comprising a tiered frame having lower unit storage sections and upper unit storage sections;
   a second cell assembly comprising a tiered frame having lower unit storage sections and upper unit storage sections;
   injection molding machine units arranged individually in the respective unit storage sections of the first and second cell assemblies and comprising a die clamping unit and a injection unit each;
   temperature controllers which control the respective temperatures of the injection molding machine units of the first cell assembly;
   material supply means which supply a material to the injection molding machine units of the first cell assembly;
   temperature controllers which control the respective temperatures of the injection molding machine units of the second cell assembly;
   material supply means which supply the material to the injection molding machine units of the second cell assembly,
   piping of the temperature controllers of the first cell assembly and the material supply means being arranged in a layout space on the backside of the first cell assembly,
   piping of the temperature controllers of the second cell assembly and the material supply means being arranged in a layout space on the backside of the second cell assembly,
   a space which is accessible to an operator being formed between the respective back portions of the first and second cell assemblies.

3. An injection molding apparatus comprising:
   cell assemblies comprising tiered frames having lower unit storage sections and upper unit storage sections; and
   injection molding machine units arranged individually in the respective unit storage sections of the cell assemblies and comprising a die clamping unit and an injection unit each.

4. An injection molding apparatus according to claim 3, wherein the cell assemblies are provided with operating parts capable of independently starting and stopping the operation of the injection molding machine units.

5. An injection molding apparatus according to claim 4, wherein the cell assemblies are provided with temperature controllers which control the respective temperatures of the injection molding machine units, material supply means which supply a material to the injection molding machine units, and a cover member which covers the injection molding machine units.

6. An injection molding apparatus comprising:

cell assemblies comprising tiered frames having lower unit storage sections and upper unit storage sections;

lower injection molding machine units arranged individually in the lower unit storage sections and comprising a die clamping unit and a injection unit each;

upper injection molding machine units arranged individually in the upper unit storage sections and comprising a die clamping unit and a injection unit each;

lower-stage product discharge chutes attached individually to the cell assemblies and extending under dies of the lower injection molding machine units;

upper-stage product discharge chutes attached individually to the cell assemblies and extending under dies of the upper injection molding machine units, the lower-stage product discharge chutes and the upper-stage product discharge chutes being staggered in the longitudinal or transverse direction of the cell assemblies.

7. An injection molding apparatus according to claim 6, wherein the lower injection molding machine units and the upper injection molding machine units are staggered in the longitudinal or transverse direction of the cell assemblies so that the lower-stage product discharge chutes and the upper-stage product discharge chutes are staggered in the longitudinal or transverse direction of the cell assemblies.

8. An injection molding apparatus comprising:

cell assemblies comprising tiered frames having lower unit storage sections and upper unit storage sections;

lower injection molding machine units arranged individually in the lower unit storage sections and comprising a die clamping unit and a injection unit each; and upper injection molding machine units arranged individually in the upper unit storage sections and comprising a die clamping unit and a injection unit each, at least the lower unit storage sections, out of the lower and upper unit storage sections, being provided with moving holders capable of being drawn out from the tiered frames, the injection molding machine units being mounted on the moving holders.

9. An injection molding apparatus comprising:

a first cell assembly comprising a tiered frame having lower unit storage sections and upper unit storage sections;

a second cell assembly comprising a tiered frame having lower unit storage sections and upper unit storage sections;

injection molding machine units arranged individually in the respective unit storage sections of the first and second cell assemblies and comprising a die clamping unit and a injection unit each; and coupling means which couple the first and second cell assemblies to each other, at least the lower unit storage sections of the first and second cell assemblies being provided with moving holders capable of being drawn out from the tiered frames, the injection molding machine units being mounted on the moving holders.

10. An injection molding apparatus comprising:

a first cell assembly comprising a tiered frame having lower unit storage sections and upper unit storage sections;

a second cell assembly comprising a tiered frame having lower unit storage sections and upper unit storage sections;

injection molding machine units arranged individually in the respective unit storage sections of the first and second cell assemblies and comprising a die clamping unit and a injection unit each; and coupling means which couple the first and second cell assemblies to each other with the respective back portions thereof kept apart.

11. An injection molding apparatus according to claim 10, wherein the first and second cell assemblies are coupled to each other by means of the coupling means with a space accessible to an operator secured between the respective back portions of the cell assemblies, the space having temperature control piping and material supply means therein.

12. An injection molding apparatus comprising:

a first cell assembly comprising a tiered frame having lower unit storage sections and upper unit storage sections;

a second cell assembly comprising a tiered frame having lower unit storage sections and upper unit storage sections; and injection molding machine units arranged individually in the respective unit storage sections of the first and second cell assemblies and comprising a die clamping unit and a injection unit each, the respective tiered frames of the first and second cell assemblies being provided with junctions which butt the cell assemblies during transportation of the cell assemblies.

13. An injection molding apparatus according to claim 12, wherein the respective tiered frames of the first and second cell assemblies are provided with the junctions on the back portions thereof, and the junctions are coupled to each other by means of bolts with the cell assemblies back to back during transportation.

\* \* \* \* \*